(12) United States Patent
Roddy

(10) Patent No.: US 6,363,156 B1
(45) Date of Patent: Mar. 26, 2002

(54) INTEGRATED COMMUNICATION SYSTEM FOR A VEHICLE

(75) Inventor: Timothy S. Roddy, Plymouth, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/195,399

(22) Filed: Nov. 18, 1998

(51) Int. Cl.7 .................................................. H04B 1/00
(52) U.S. Cl. ......................................... 381/86; 381/71.4
(58) Field of Search ........................ 381/86, 71.2, 71.4, 381/71.6, 71.9, 71.11, 71.12, 94.1, 56, 57

(56) References Cited

U.S. PATENT DOCUMENTS

| 4,625,083 A | 11/1986 | Poikela |
| 4,677,676 A | 6/1987 | Eriksson |
| 4,677,677 A | 6/1987 | Eriksson |
| 4,819,263 A | 4/1989 | Franklin |
| 5,003,606 A | 3/1991 | Bordewijk |
| 5,033,082 A | 7/1991 | Eriksson et al. |
| 5,185,803 A | 2/1993 | Moyski et al. |
| 5,325,437 A * | 6/1994 | Doi .............................. 381/86 |
| 5,386,477 A | 1/1995 | Popovich et al. |
| 5,473,699 A | 12/1995 | Tamamura et al. |
| 5,525,977 A | 6/1996 | Suman |
| 5,528,691 A | 6/1996 | Rosauer et al. |

FOREIGN PATENT DOCUMENTS

| JP | 60161233 | 8/1985 |
| WO | WO 96/32804 | 10/1996 |
| WO | WO 97/19833 | 6/1997 |

* cited by examiner

Primary Examiner—Minsun Oh Harvey
(74) Attorney, Agent, or Firm—Brooks & Kushman P.C.

(57) ABSTRACT

An audio communication system for use in the passenger compartment of a vehicle providing full duplex communication through a plurality of speakers and microphones while substantially eliminating unwanted external interference and feedback. A digital signal processor further integrates an audio entertainment and mobile transceiver subsystems. The subsystems are operated by the microphone from one or more positions within the vehicle so that each passenger has access to a cellular phone or can control the audio entertainment system.

15 Claims, 1 Drawing Sheet

INTEGRATED COMMUNICATION SYSTEM FOR A VEHICLE

BACKGROUND OF THE INVENTION

The present invention generally relates to a communication system, and more particularly to a full duplex communication system for simultaneously transmitting voice information between front and rear seating areas while integrating voice actuated control of vehicle electronic subsystems.

In a typical vehicle, a driver of the vehicle must, of necessity, face forward in the direction of forward travel of the vehicle. In passenger compartments containing additional rows of seats, the driver and any other front seat passengers are thus facing away from rear seat occupants. Consequently, a passenger may have difficulty understanding or hearing the speech of the driver or anyone else forward of the passenger.

It is known to use a microphone in the front or rear seating area to pick up voices which are then amplified and reproduced by a speaker in another seating area. A particular problem encountered in such a system is acoustic feedback between the speaker and closely spaced microphones located at each occupant position. Microphone reception of vehicle related noise is retransmitted through the microphones and speakers located within the passenger compartment thereby further degrading communication efficiency. Another problem is that known systems allow only one passenger to speak at a time thus preventing the speech of one passenger if either passenger attempts to speak over the other.

A further limitation of known systems is associated with the control of vehicle subsystems. Known systems are primarily controlled solely from the operator position and are limited to manual switch activation. However, it is desirable at times to provide passengers with control of vehicle subsystems such as an audio entertainment or cellular phone subsystems to eliminate tasks demanded of the operator.

SUMMARY OF THE INVENTION

The present invention provides a full duplex communication system for a vehicle passenger compartment which integrates voice actuated control of vehicle electronic and entertainment systems.

In general terms, this invention is an audio communication system for use in the passenger compartment of a vehicle which includes a first microphone and a first speaker located at a first position of the passenger compartment, such as proximate to the operator's position. A second microphone and a second speaker are located a distance away from the first microphone and speaker at a second position within the passenger compartment. The second microphone and the second speaker can be located, for example, at a passenger position in the rear of the vehicle.

Preferably, a microphone and a speaker are located at each occupant position within the vehicle passenger compartment. A plurality of microphone and speaker combinations can be located within the passenger compartment and the digital signal processor simultaneously outputs the signals of each microphone through all the attached speakers. The speakers are, preferably, the same audio system speakers commonly installed in passenger vehicles for use with the audio entertainment system. The digital signal processor transmits the signal generated by the microphones while simultaneously canceling non-input signals originating external to the system. The digital signal processor thus allows full duplex communication while substantially eliminating unwanted external interference and feedback.

Modem vehicles typically include an audio entertainment subsystem such as a radio and often include a mobile transceiver, such as a cellular phone. The present invention integrates each subsystem into the vehicle communication system. The subsystems are voice actuated from one or more positions within the vehicle. Thus, each passenger has access to a cellular phone or can control the audio entertainment system.

In systems intended for high volume vehicle production, it is desirable to reduce the parts and cost of a communication system. The usage of voice actuated vehicle controls and communication through a common processor, microphones, and speakers reduces the quantity of parts and the overall cost of the communication system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
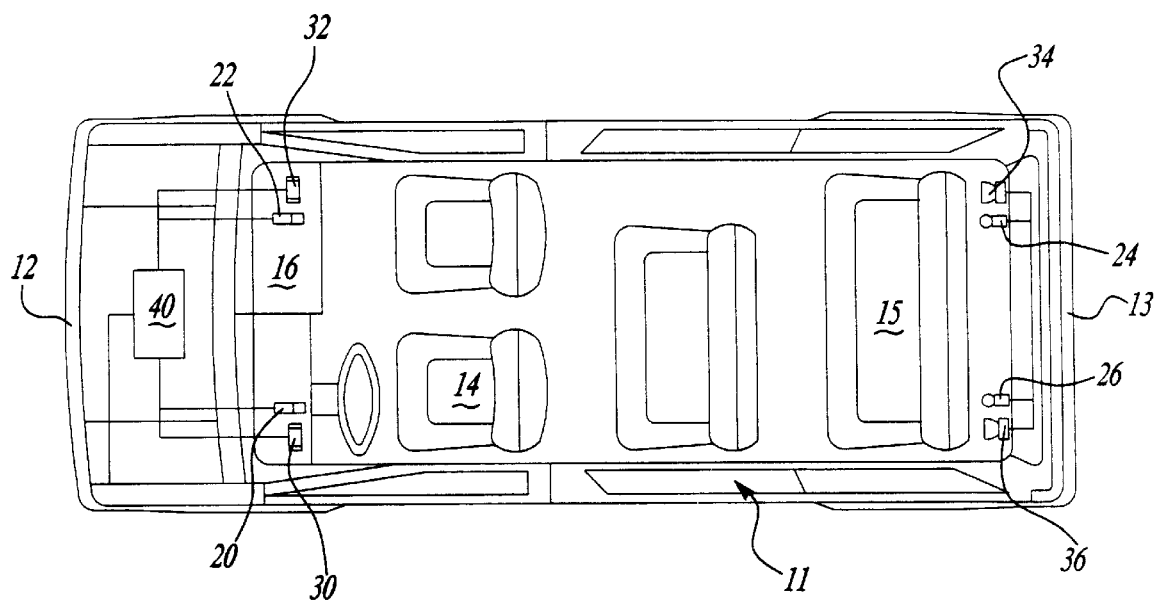
FIG. 1 is a top view showing a communication system of the present invention incorporated into a passenger compartment of a vehicle.

FIG. 1 illustrates a vehicle communication system 10 of the present invention installed in a vehicle passenger compartment 11 having a front end 12 and a rear end 13. A front seat 14 provides seating for a driver, and a rear seat 15 provides seating for the rear passengers. In the illustrated embodiment, four microphones 20–26 are located adjacent four speakers 30–36 in the vehicle passenger compartment 11. The first input microphone 20 and the second input microphone 22 are located at a first position, here illustrated as the front end 12 of the vehicle. A third 24 and fourth 26 input microphone are located at a second position, here illustrated as the rear end 13 of the vehicle. First 30 and second 32 speakers are located adjacent the first 20 and second 22 input microphones in the first position 12 and third 34 and fourth 36 speakers are located adjacent the third 24 and fourth 26 input microphones in the second position. Input signals from microphones 20–26 are provided to a signal processing circuit 40 which interprets the signals and provides output signals to the speakers 30–36. Preferably, the speakers 30–36 are the same speakers used by an audio entertainment system and therefore any number of speakers can be integrated to the system while duplication of components is minimized.

The microphones 20–26 are located adjacent each speaker 30–36 and are preferably located to provide ready access to the driver and each passenger. Each microphone 20–26 and speaker 30–36 are connected to a digital signal processing module 40 which can be located behind a vehicle dashboard 16, for example.

Figure 2:
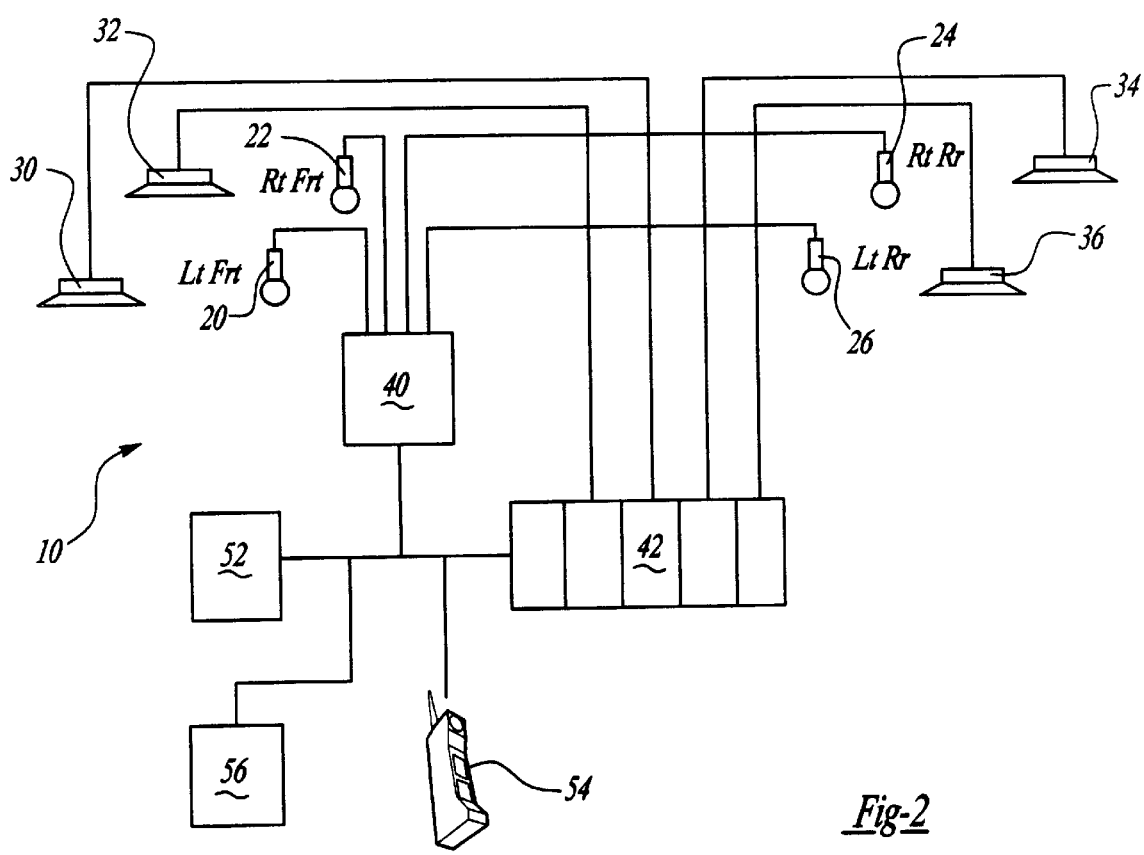
FIG. 2 is a block diagram showing the communication system of FIG. 1 in greater detail.

FIG. 2 illustrates, in block diagram form, the communication system of FIG. 1 in greater detail. In one embodiment a first microphone signal is generated by the microphone, when, for example, a driver wishes to speak to the vehicle passengers. The signals output from the microphones 20–26 are passed to the digital signal processor 40. As will be further described below the microphone signal is passed by the digital signal processor 40 to the appropriate speakers 30–36 or electrical subsystem.

When communication is initiated from the driver for example, microphone signals are generated by the first microphone 20. The microphone signals are passed directly to the digital signal processor 40. The digital signal processor 40 analyzes the the microphone signals and directs the speech signals generated from the first microphone to an amplifier 42 which amplifies the signal in a known manner. The amplified speech signals are there passed to every speaker 32–36 not adjacent to the first microphone 20.

Signals not originating from the first microphone 20 are stripped away by the digital signal processor 40. However, the speech signals which are input to the first microphone 20 do produce an output from the digital signal processor 40 and are thus amplified and passed to the non-adjacent speakers 32–36. Therefore, the signals output from the speakers 32–36 are stripped away and not contributed to the input of the first microphone 20 and acoustic feedback is substantially prevented.

The digital signal processor 40 preferably provides a filter between the speakers 30–36 and the microphones 20–26. The digital signal processor 40 can additionally provide noise cancellation in circuitry or signal processing software to eliminate low frequency periodic noise such as that which originates from the vehicle engine or tires.

The amplifier 42 preferably provides a fixed gain which is adequate to enhance conversation quality in the vehicle but which is at a level where acoustic feedback does not occur. Alternatively, the total gain of the system (i.e, volume) can be controlled by the passengers up to a maximum gain which corresponds to a gain below the level where acoustic feedback is likely to occur.

FIG. 2 further shows a preferred embodiment for integrating the communication system of the present invention with voice actuation of vehicle subsystems. Specifically, the communication system shares the microphones 20–26 and speakers 30–36 with an integral cellular phone 50 and an audio system 52. Additionally, any vehicle component 56 operated electrically such as lights, windshield wipers, and climate controls can be further integrated with the digital signal processor 40 to provide voice actuation and control.

An audio entertainment subsystem 52, such as, a radio, a cassette player, and/or CD system, generates an output to each of the speakers 30–36. The digital signal processor 40 is connected with the audio entertainment subsystem 52 to control operation of the audio system 52 in response to operator inputs. Preferably, each microphone 20–26 receives voice input from the driver or passenger seated adjacent to one of the microphone 20–26. Each passenger is thus able to control the audio entertainment system 52 from any position within the passenger compartment.

As the communication system shares the speakers 30–36 with the audio entertainment subsystem 52, the digital signal processor 40 overlays inter-vehicle communication and the output of the audio entertainment subsystem 52. Additionally, the audio entertainment system 56 can be automatically muted or reduced in volume when inter-vehicle communication is initiated to further improve the ability of the passengers to communicate.

The digital signal processor 40 firther integrates a hands-free mobile transceiver subsystem 54, such as a cellular phone. The digital signal processor 40 couples the microphones 20–26 and speakers 30–36 to the transceiver subsystem 54 such that each passenger can speak and hear through the cellular phone in hands-free mode. When the transceiver subsystem 54 is not in hands-free mode the digital signal processor 40 switches the speakers 30–36 and microphones 20–26 to inter-vehicle communication and normal audio entertainment features. Preferably the speakers 30–36 are available for normal audio entertainment, and the microphones 20–26 remain on standby prior to initiation of inter-vehicle communication. Further, the digital signal processor 40 recognizes selection of the audio entertainment system 52, or the transceiver subsystem 54, and configures the microphones and speakers as appropriate for the desired subsystem.

Preferably, the transceiver subsystem 54 and audio entertainment subsystem 52 controls can be selectively dedicated to just one microphone. Thus, only the control position, preferably the driver's position, would have access to each subsystem. Additionally, the control position can preferably connect one or more other positions to have access to the subsystems. Thus, only the driver, or those passengers selected by the driver, would have full access to the subsystems.

The foregoing description is exemplary rather than limiting in nature. Obviously, many modifications and variations of the present invention are possible in light of the above teachings. It is, therefore, to be understood that within the scope of the appended claims the invention may be practiced otherwise than as specifically described.

What is claimed is:

1. A communication system for a vehicle passenger compartment comprising:

a first microphone generating first microphone signals located at a first position within said passenger compartment;

a second microphone generating second microphone signals located at a second position within said passenger compartment, said second microphone separated from said first microphone by a first distance;

a digital signal processor receiving said first and second microphone signals;

a first speaker located proximate said first microphone, said first speaker connected to said digital signal processor to output said second microphone signals in response to said digital signal processor;

a second speaker located proximate said second microphone, said second speaker connected to said digital signal processor to output said first microphone signals in response to said digital signal processor; and an audio entertainment system electrically coupled to said digital signal processor, said audio entertainment system outputting audio signals through said first and second speakers;

said digital signal processor substantially canceling communication of said first and second speaker output from said first and second microphone signals.

2. The communication system according to claim 1, wherein said digital signal processor filters said microphone signals between said microphones and said speakers.

3. The communication system according to claim 1, wherein said digital signal processor simultaneously receives input from each of said first and second microphones.

4. The communication system according to claim 1, further comprising an amplifier electrically coupled between said digital signal processor and said first and second speaker.

5. The communication system according to claim 1, wherein said audio entertainment system is reduced in volume when inter-vehicle communication is initiated.

6. The communication system according to claim 1, further comprising an electrically operated component electrically coupled to said digital signal processor, said component being actuated by audio input through one of said microphones.

7. The communication system according to claim 1, wherein said first and second microphones and said first and second speakers have a fixed acoustic relationship within the vehicle.

8. The communication system according to claim 1, wherein said first and second microphones and said first and second speakers have a fixed spacial relationship within the vehicle.

9. The communication system according to claim 1, wherein said digital signal processor filters non-voice audio input to said first and second microphones.

10. The communication system according to claim 9, wherein said first and second microphones remain on standby prior to initiation of inter-vehicle communication.

11. The communication system according to claim 1, further comprising a plurality of microphones and a plurality of speakers.

12. The communication system according to claim 11, wherein said digital signal processor outputs said first microphone signals to a speaker non-adjacent said first microphone.

13. The communication system according to claim 12, further comprising a controller to select which of said plurality of microphones are electrically coupled to said audio entertainment system, said audio entertainment system being actuated by audio input through said selected microphone.

14. A communication system for a vehicle passenger compartment comprising:

a first microphone generating first microphone signals located at a first position within said passenger compartment;

a second microphone generating second microphone signals located at a second position within said passenger compartment, said second microphone separated from said first microphone by a first distance;

a digital signal processor receiving said first and second microphone signals;

a first speaker located proximate said first microphone, said first speaker connected to said digital signal processor to output said second microphone signals in response to said digital signal processor;

a second speaker located proximate said second microphone, said second speaker connected to said digital signal processor to output said first microphone signals in response to said digital signal processor; and a mobile transceiver system electrically coupled to said digital signal processor, said mobile transceiver outputting audio through at least one of said first and second speakers, wherein said mobile transceiver system receives audio input from one of said first and second microphones;

said digital signal processor substantially canceling communication of said first and second speaker output from said first and second microphone signals.

15. The communication system according to claim 14, wherein said mobile transceiver system simultaneously receives audio input from each of said first and second microphones.

* * * * *